US005873238A

United States Patent [19]

Bellows

[11] Patent Number: 5,873,238

[45] Date of Patent: Feb. 23, 1999

[54] STARTUP COOLING STEAM GENERATOR FOR COMBUSTION TURBINE

[75] Inventor: James C. Bellows, Maitland, Fla.

[73] Assignee: Siemens Westinghouse Power Corporation, Orlando, Fla.

[21] Appl. No.: 772,479

[22] Filed: Dec. 23, 1996

[51] Int. Cl.[6] .......... F02C 6/18; F02C 7/18; F02C 7/26

[52] U.S. Cl. .......... 60/39.182; 60/39.142; 122/7 R

[58] Field of Search .......... 60/39.182, 39.141, 60/39.142; 122/7 R, 7 B, 1 R

[56] References Cited

U.S. PATENT DOCUMENTS

| | | | |
|---|---|---|---|
| 4,424,668 | 1/1984 | Mukherjee | 60/39.182 |
| 4,510,755 | 4/1985 | Gartmann et al. | 60/657 |
| 4,519,207 | 5/1985 | Okabe | 60/39.182 |
| 4,571,935 | 2/1986 | Rice | 60/39.182 |
| 4,989,405 | 2/1991 | Duffy et al. | 122/7 R |
| 5,189,873 | 3/1993 | Mishima et al. | 60/39.182 |
| 5,412,937 | 5/1995 | Tomlinson et al. | 60/39.182 |
| 5,471,832 | 12/1995 | Sugita et al. | 60/39.182 |
| 5,473,898 | 12/1995 | Briesch | 60/39.182 |
| 5,577,377 | 11/1996 | Tomlinson | 60/39.182 |
| 5,613,356 | 3/1997 | Frutschi | 60/39.182 |
| 5,628,179 | 5/1997 | Tomlinson | 122/7 R |

FOREIGN PATENT DOCUMENTS

| | | | |
|---|---|---|---|
| 0093907 | 5/1984 | Japan | 60/39.182 |

*Primary Examiner*—Charles G. Freay
*Assistant Examiner*—Ted Kim

[57] ABSTRACT

A startup cooling steam generator (36) is disclosed. The generator provides cooling steam (40) to a combustion turbine (2) shortly after the combustion turbine begins to operate. Cooling steam is generated in a once-through system by passing hot exhaust gases generated by the combustion turbine over an immediately adjacent metal tubing apparatus filled with liquid. The startup steam generator (35) is operable in parallel with the main heat recovery steam generator (6).

18 Claims, 3 Drawing Sheets

STARTUP COOLING STEAM GENERATOR FOR COMBUSTION TURBINE

FIELD OF THE INVENTION

The present invention relates generally to combustion turbines. More particularly, the present invention relates to a steam generator for use in cooling a combustion turbine during startup.

BACKGROUND OF THE INVENTION

In a combined cycle generator system, exhaust heat from a first system, referred to as the top cycle, is used to generate power in a second system, referred to as the bottom cycle. Such combined cycle systems typically employ a combustion turbine in the top cycle, and a steam turbine in the bottom cycle. A heat recovery steam generator (HRSG) uses the hot exhaust gas from the combustion turbine to produce steam which drives one or more steam turbines.

Cooling the combustion turbine is critically important. The combustors and transitions of a combustion turbine are exposed to extreme heat and require substantial cooling. For example, the combustion turbine inlet gas which travels through the combustion turbine transition pieces may reach temperatures of 1425° C.

Recent combustor and transition cooling designs employ closed systems in which a coolant circulates within the component, thus allowing an increase in turbine inlet temperature without raising flame temperature. The coolant may comprise steam or air. Where steam is the selected coolant, it is often removed from the steam turbine, and used to cool components in the combustion turbine. After cooling the combustor and transition, the steam is re-routed to the steam turbine where useful energy is recovered.

A prior art two cycle generating system as described above is pictured in FIG. 1. As shown, a combustion turbine 2 is coupled to a heat recovery steam generator (HRSG) 6 via an exhaust duct 4. The HRSG 6 has access to a supply of water which is pumped 16 from a condenser 14 located in the bottom cycle of the two cycle system. The hot gas exhaust exiting the combustion turbine 2 heats the water flowing through the HRSG internal tubing 7 and thereby generates steam. That steam, after being routed through a valve 10 and duct 8 apparatus, powers the steam turbine 12.

A portion of the steam from the high pressure section of the steam turbine 12 is routed via a duct 20 to the combustion turbine 2. The steam enters the cooling channels of the combustors, transitions, and blading. The steam thereby cools the combustion turbine walls and blading by absorbing heat. The steam is then commonly returned via a duct 5 to the steam turbine.

When the steam turbine is operating stably at normal operating speeds and temperatures, obtaining steam for cooling the combustion turbine 2 is easily accomplished. However, during startup, or that time when the system is just beginning to operate, sufficient steam is not available to cool the combustion turbine 2. Typically, the HRSG 6 employed in a two cycle system must be large in order that it be able to generate large quantities of steam to power the steam turbine 12. However, a large HRSG 6 does not react quickly to the heat of the combustion turbine exhaust. The HRSG 6 does not become warm sufficiently quickly to generate steam which can be used in cooling the combustion turbine 2 during startup. Without sufficient steam, the danger exists that components of the combustion turbine 2 could be damaged by excessive heat.

One possible method of providing cooling steam during startup would be to employ a conventional auxiliary steam generator. However, this would prove to be an inefficient solution. If an auxiliary steam generator were employed, a separate source of fuel would be required to operate the auxiliary steam generator. Also, during the periods when the auxiliary steam generator would be in use, the HRSG most probably would remain idle and as a consequence the heat generated by the combustion turbine would not be put to productive use. Furthermore, once the combustion turbine reached a normal operating temperature and the HRSG began to operate, the auxiliary steam generator would no longer be required and most likely would remain idle. Thus, employing a conventional auxiliary steam generator would require excess fuel and would be an inefficient use of resources.

Applicant has recognized that sufficient steam to cool the combustion turbine 2 cannot be generated during startup by the HRSG. The equipment currently used to generate steam is too massive and therefore unreactive at the early stages of system operation. Further, conventional auxiliary steam generators do not provide an efficient solution to the problem.

It is therefore desirable to provide an efficient system which supplements the normal steam generating apparatus so as to provide adequate and efficient cooling to the combustion turbine 2 during startup.

SUMMARY OF THE INVENTION

Accordingly, it is the general object of the current invention to provide an efficient system which supplements the normal steam generating apparatus so as to provide adequate and efficient cooling to the combustion turbine during startup.

Briefly, this object, as well as other objects of the current invention, is accomplished in a system comprising a means for receiving fluid, a means for exposing the fluid to heat from the combustion turbine exhaust so as to evaporate the fluid into steam, and a means for providing the steam to the combustion turbine. The means for receiving fluid comprises a pump, a valve operably coupled to the pump, a polisher operably coupled to the valve, and a duct operably coupled to the polisher. The means for exposing the fluid to heat from the combustion turbine exhaust comprises a fluid intake, metal tubing operably coupled to the fluid intake, and a steam output operably coupled to the metal tubing. The means for providing steam to the combustion turbine comprises a second duct and a valve operably coupled to the second duct.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed.

In the drawings.

DETAILED DESCRIPTION OF THE PREFERRED EMBODIMENTS

Figure 1:
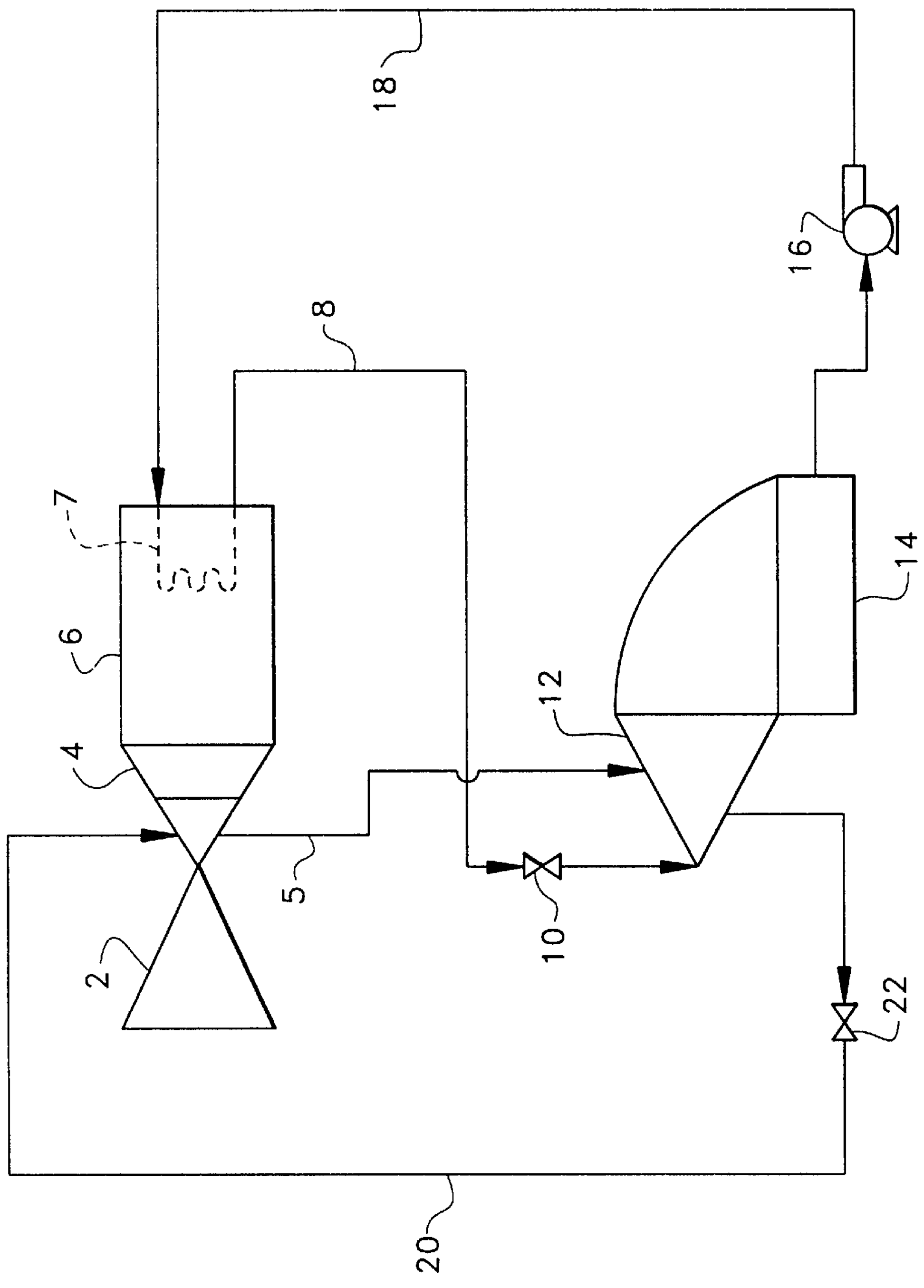
FIG. 1 (PRIOR ART)
FIG. 1 is a schematic diagram of a prior art combined cycle generation system with steam cooled combustor/transitions.
Figure 2:
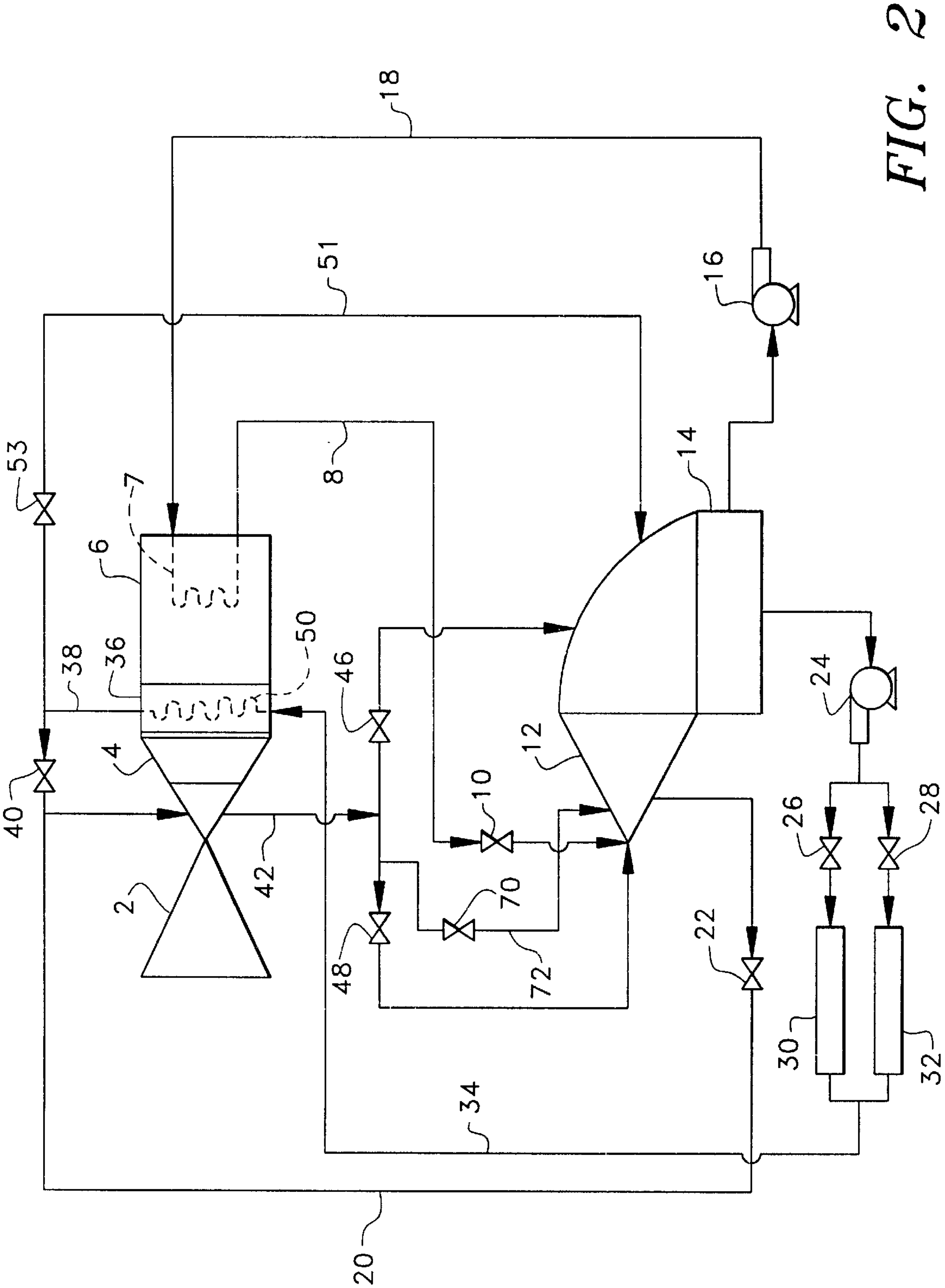
FIG. 2 is a schematic diagram of a combined cycle generation system wherein the present invention is employed.
Figure 3:
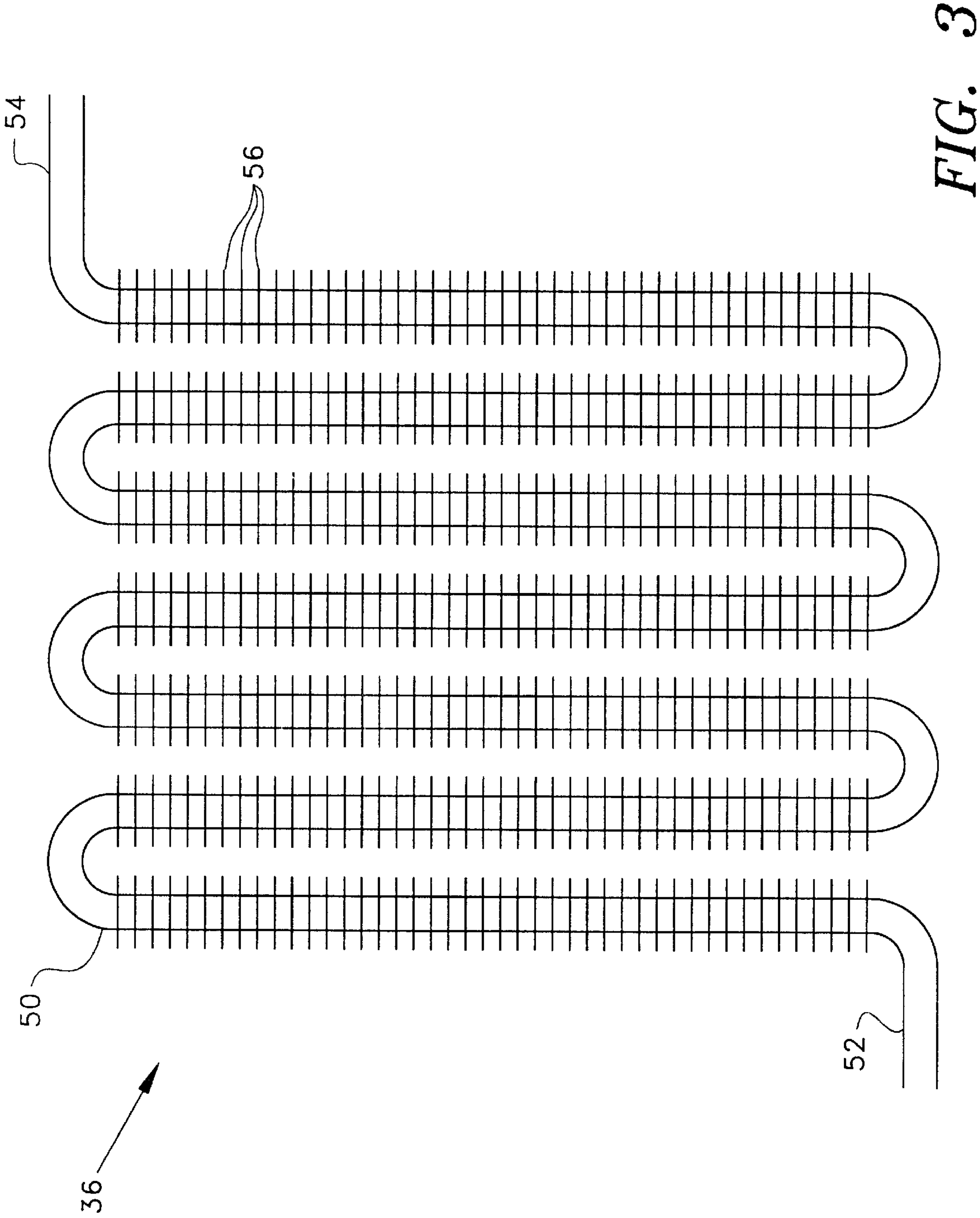
FIG. 3 is a detailed schematic diagram of the inventive startup cooling steam generator.

FIGS. 2 and 3 depict a presently preferred embodiment of the present invention. As shown in FIG. 2, the inventive startup cooling steam generator 36 is located immediately adjacent to the combustion turbine exhaust duct 4. In contrast to the HRSG 6, and as is described below, the inventive startup cooling steam generator 36 has minimal mass and is therefor quick to react to the exhaust gas. Exhaust gases from the combustion turbine 2 rapidly heat the steam generator tubing 50, allowing the startup cooling steam generator 36 to produce steam quickly. The steam is routed through a duct 38 and valve 40 to the combustion turbine 2.

As shown, a duct 42 carries the steam away from the combustion turbine 2. During startup, when the steam turbine 12 has not yet reached operational capacity, the steam is routed through a first valve 46 to the steam turbine condenser 14. The steam may be alternately routed through a second valve 48 to warm the steam turbine before the steam turbine has started. When the steam turbine 12 reaches operational capacity, the steam emerging from the combustion turbine 2 is routed through a third valve 70 and duct 72 into the middle of the steam turbine where the steam is used to help drive the steam turbine 12.

Water for generating steam is drawn from the steam turbine condenser 14. A pump 24 moves the water from the condenser 14, through a parallel arrangement of polishers 30, 32 or a water purification systems, to the steam generator 36. The polishers 30, 32 clean the water of impurities that otherwise might aggregate in the startup cooling steam generator 36 or the combustion turbine 2. Either polisher 30, 32 alone is capable of providing sufficient amounts of clean water to the startup cooling steam generator 36.

As noted above, a primary object of the startup cooling steam generator 36 is to provide steam quickly to the combustion turbine 2 soon after the combustion turbine begins to operate. A necessary characteristic of such a generator is that it heat quickly in response to the heat of the combustion turbine exhaust. The startup cooling steam generator 36 has been designed with minimal mass so as to respond quickly to the heat of the exhaust gas. In the presently preferred embodiment as depicted in FIG. 3, the cooling steam generator 36 comprises a minimal series of interconnected tubing or pipes 50. The tubing 50 serves as a boiler in which the water is evaporated into steam. Water is pumped into the tubing through a fluid intake 52. Exhaust from the combustion turbine 2 heats the tubing 50 and the water contained therein. The heat evaporates the water into steam which flows out of the steam output 54 on its way to the combustion turbine 2. In the presently preferred embodiment the tubing 50 is finned 56 so as to allow for quick and efficient transfer of heat from the exhaust gas to the water flowing through the tubing.

Typically, in conventional once-through boilers such as the one contained in the present invention, a flash tank is employed. A flash tank is a small drum used to hold water after the boiling component has been cleaned. A flash tank aggregates impurities such as iron oxides that may be present in the water. As can be recognized by inspecting FIG. 3, the inventive cooling steam generator does not contain a flash tank. A flash tank would add mass to the embodiment, slow the heating rate of the startup cooling steam generator 36, and thereby delay the production of steam. However, because the startup cooling steam generator does not comprise a flash tank in which to collect impurities such as iron oxides, alternative methods of excluding oxides were designed into the inventive startup cooling steam generator 36. In the presently preferred embodiment, the boiler tubing 50 as well as the ducts 34, 38 between the polishers 30, 32 and the combustion turbine 42, as shown in FIG. 2, are manufactured from a non oxidizing material such as stainless steel. This design eliminates the need for the flash tank and in so doing remains consistent with the desired minimal mass architecture.

The steam used to cool the combustion turbine must be dry steam. A two-phased mixture of water and steam would expose the combustion turbine 2 to thermal shocks and potentially over stress or fatigue the cooled parts. Dry steam can be recognized as having at least 25° F. superheat. Only when the steam is dry should it be routed to the combustion turbine 2 for use in cooling.

Therefore, any steam or water which is located in the startup cooling steam generator 36 upon startup should be recycled back to the condenser 14 until the steam generated by the startup cooling steam generator 36 is superheated. During startup, a first valve 40 as shown in FIG. 2, is closed and a second valve 53 is open so as to route the non-superheated steam back to the condenser 14. When it is certain that the steam is superheated, the first valve 40 is opened and the second valve 53 is closed allowing the steam to be routed to the combustion turbine 42.

The present invention may be embodied in other specific forms without departing from the spirit or essential attributes thereof; for example, the startup cooling steam generator may have different shapes and configurations other than those depicted in the figures. Similarly, alloys other than stainless steel could be used to manufacture the startup cooling steam tubing and ducts. Accordingly, reference should be made to the appended claims, rather than to the foregoing specification, as indicating the scope of the invention.

I claim:

1. A system for generating steam from a heated exhaust of a combustion turbine comprising: a first steam generation circuit means and a second steam generation circuit means operable in parallel with the first steam generation circuit means for cooling heat sensitive components of the combustion turbine through a cooling circuit within the combustion turbine, said second steam generation circuit means comprising:

first means for supplying fluid during startup of the combustion turbine;

second means for receiving the fluid and exposing the fluid received from said first means to the heated exhaust generated by the combustion turbine during startup so as to evaporate the fluid and generate steam, said second means being sized to generate a sufficient volume of steam within a substantially minimal time period at startup of the combustion turbine to satisfy the requirements of the cooling circuit; and, third means for providing substantially all of the steam generated by said second means to the combustion turbine cooling circuit so as to cool the combustion turbine during startup.

2. The system as recited in claim 1 wherein said first means comprises:

a pump for moving fluid;

a valve operably coupled to said pump for regulating the fluid moved by said pump;

a polisher operably coupled to said valve for purifying the fluid that is moved by said pump and regulated by said valve; and a duct operably coupled to said polisher for routing the fluid from said polisher to said second means.

3. The system as recited in claim 2 wherein said duct operably coupled to said polisher is manufactured from a non-oxidizing material.

4. The system as recited in claim 1 further comprising a steam turbine having a condenser, wherein said first means comprises:

a pump operably coupled to the condenser for moving fluid from the condenser;

a valve operably coupled to said pump for regulating the fluid moved by said pump;

a polisher operably coupled to said valve for purifying the fluid that is moved by said pump and regulated by said valve; and a duct operably coupled to said polisher for routing the fluid from said polisher to said second means.

5. The system as recited in claim 1 wherein said second means comprises metal tubing for exposing the fluid to the heated exhaust.

6. The system as recited in claim 1 wherein said second means comprises:

a fluid intake for accepting fluid from said first means;

metal tubing operably coupled to said fluid intake for exposing the fluid accepted by said fluid intake to the heated exhaust and thereby evaporate the fluid and generate steam; and a steam output operably coupled to said metal tubing for routing the steam produced in said metal tubing out of said metal tubing to said third means.

7. The system as recited in claim 6 wherein said metal tubing operably coupled to said fluid intake is finned tubing.

8. The system as recited in claim 6 wherein said metal tubing is manufactured from a non-oxidizing metal and said fluid intake and said steam output are manufactured from a non-oxidizing material.

9. The startup steam generator as recited in claim 1 wherein said third means comprises:

a duct for routing the steam that is generated in said second means to the combustion turbine; and a valve operably coupled to said duct for regulating the steam routed through said duct.

10. In a two phase generator system having a combustion turbine, a steam turbine, a heat recovery steam generator receiving input thermal energy from the combustion turbine exhaust and having a first steam generating circuit operably coupled to the steam turbine to drive the turbine shaft and the combustion turbine to cool its heat sensitive components through an internal cooling circuit, and a condenser operably coupled to the steam turbine and the heat recovery steam generator, a second steam generating circuit, operable in parallel with said first steam generating circuit for generating steam from the heated exhaust of the combustion turbine, for supplying cooling steam to the combustion turbine upon startup comprising:

first means for supplying fluid during startup of the combustion turbine;

second means for receiving the fluid and exposing the fluid received by said first means to the heated exhaust generated by the combustion turbine during startup so as to evaporate the fluid and generate steam, said second means being sized to generate a sufficient volume of steam within a substantially minimal time period at startup of the combustion turbine to satisfy the requirements of the cooling circuit; and, third means for providing substantially all of the steam generated by said second means to the combustion turbine cooling circuit so as to cool the combustion turbine during startup.

11. The system as recited in claim 10 wherein said first means comprises:

a pump operably coupled to the condenser for moving fluid from the condenser;

a valve operably coupled to said pump for regulating the fluid moved by said pump;

a polisher operably coupled to said valve for purifying the fluid that is moved by said pump and regulated by said valve; and a duct operably coupled to said polisher for routing the fluid from said polisher to said second means.

12. The system as recited in claim 11 wherein said duct operably coupled to said polisher is manufactured from a non-oxidizing material.

13. The system as recited in claim 10 wherein said second means comprises metal tubing for exposing the fluid to the heated exhaust.

14. The system as recited in claim 10 wherein said second means comprises:

a fluid intake for accepting fluid from said first means;

metal tubing operably coupled to said fluid intake for exposing the fluid accepted by said fluid intake to the heated exhaust and thereby evaporate the fluid and generate steam; and a steam output operably coupled to said metal tubing for routing the steam produced in said metal tubing out of said metal tubing to said third means.

15. The system as recited in claim 14 wherein said metal tubing operably coupled to said fluid intake is finned tubing.

16. The system as recited in claim 14 wherein said metal tubing is manufactured from a non-oxidizing metal and said fluid intake and said steam output are manufactured from a non-oxidizing material.

17. The system as recited in claim 10 wherein said third means comprises:

a duct for routing the steam that is generated in said second means to the combustion turbine; and a valve operably coupled to said duct for regulating the steam routed through said duct.

18. The system as recited in claim 10 wherein the steam exiting from the cooling circuit is routed to an input of the steam turbine to preheat the steam turbine.

* * * * *